US 11,460,336 B2
Oct. 4, 2022

(12) United States Patent
Lecours et al.

(54) IOT SYSTEM FOR RETURNABLE ASSET CONTAINING CRYOGENIC LIQUID

(71) Applicants: L'Air Liquide, Société Anonyme pour l'Etude et l'Exploitation des Procédés Georges Claude, Paris (FR); Alizent USA, Inc., Houston, TX (US)

(72) Inventors: Alain Lecours, Boisbriand (CA); Celine Tranquillin, Houston, TX (US); Felix H. Tang, Houston, TX (US)

(73) Assignees: L'Air Liquide, Société Anonyme pour l'Etude et l'Exploitation des Procédés Georges Claude, Paris (FR); Alizent USA, Inc., Houston, TX (US)

( * ) Notice: Subject to any disclaimer, the term of this patent is extended or adjusted under 35 U.S.C. 154(b) by 0 days.

(21) Appl. No.: 17/072,564

(22) Filed: Oct. 16, 2020

(65) Prior Publication Data
US 2021/0116291 A1 Apr. 22, 2021

Related U.S. Application Data

(60) Provisional application No. 62/916,033, filed on Oct. 16, 2019.

(51) Int. Cl.
*G01F 25/20* (2022.01)
*F25B 21/02* (2006.01)
*G01F 23/26* (2022.01)

(52) U.S. Cl.
CPC ............. *G01F 25/20* (2022.01); *F25B 21/02* (2013.01); *G01F 23/26* (2013.01)

(58) Field of Classification Search
CPC ...... G01F 23/26; G01F 25/0061; G01F 25/00; F25B 21/02; H01L 37/00; H01L 35/00;
(Continued)

(56) References Cited

U.S. PATENT DOCUMENTS 3,221,551 A 12/1965 Hogan et al.
4,366,857 A * 1/1983 Mayer ................... F28D 15/02
165/104.23
(Continued)

FOREIGN PATENT DOCUMENTS

EP 3 367 075 8/2018
EP 3 462 144 4/2019
(Continued)

OTHER PUBLICATIONS

International Search Report and Written Opinion for corresponding PCT/US2020/055993, dated Jan. 27, 2021.

*Primary Examiner* — John Fitzgerald
*Assistant Examiner* — Truong D Phan
(74) *Attorney, Agent, or Firm* — Elwood L. Haynes

(57) ABSTRACT

A method of providing electrical energy to a dewar containing a cryogenic liquid including introducing an insulated heat pipe, with a distal end and a proximal end, into a cryogenic dewar comprising an exterior surface. And providing a Seebeck module, with a cold junction and a hot junction. The distal end is in thermodynamic contact with a cryogenic fluid and the proximal is thermodynamically connected to the cold junction. The hot junction is thermodynamically connected to the exterior surface of the dewar, thereby producing an electrical flow in the Seebeck module. A level probe may be calibrated by taking a first capacitance reading with the dewar full, and a second capacitance reading when the cryogenic liquid level is within a calibration gap. The level probe is calibrated by utilizing the first capacitance reading and the second capacitance reading.

12 Claims, 14 Drawing Sheets

(58) Field of Classification Search
CPC ......... H01L 35/28; H01L 35/30; H01L 35/32;
H01L 35/325; H01L 35/34; H01L 23/445;
H01L 23/00; H01L 23/147; H01L 23/28;
H01L 23/31; H01L 23/32; H01L 23/34;
H01L 23/345; H01L 23/36; H01L 23/40;
H01L 23/42; H01L 23/44; H01L 23/46;
H01L 23/367; H01L 23/3672; H01L
23/38; H01L 23/4093; H01L 23/427
See application file for complete search history.

(56) References Cited

U.S. PATENT DOCUMENTS

| | | | |
|---|---|---|---|
| 4,404,809 A * | 9/1983 | Johnson | F17C 13/021 |
| | | | 137/392 |
| 2006/0086099 A1* | 4/2006 | Dickerson | F25J 1/0017 |
| | | | 62/47.1 |
| 2018/0234748 A1 | 8/2018 | Haddy et al. | |
| 2019/0101433 A1* | 4/2019 | Gabrys | F17C 13/028 |
| 2020/0064176 A1* | 2/2020 | Souques | G01F 23/0069 |
| 2020/0271116 A1* | 8/2020 | Haffenden | G01F 25/0061 |
| 2021/0055150 A1* | 2/2021 | McKay | G01F 23/266 |

FOREIGN PATENT DOCUMENTS

| | | | | |
|---|---|---|---|---|
| FR | 2 776 364 | | 9/1999 | |
| WO | WO-9947899 A1 * | | 9/1999 | ............ F17C 13/021 |

* cited by examiner

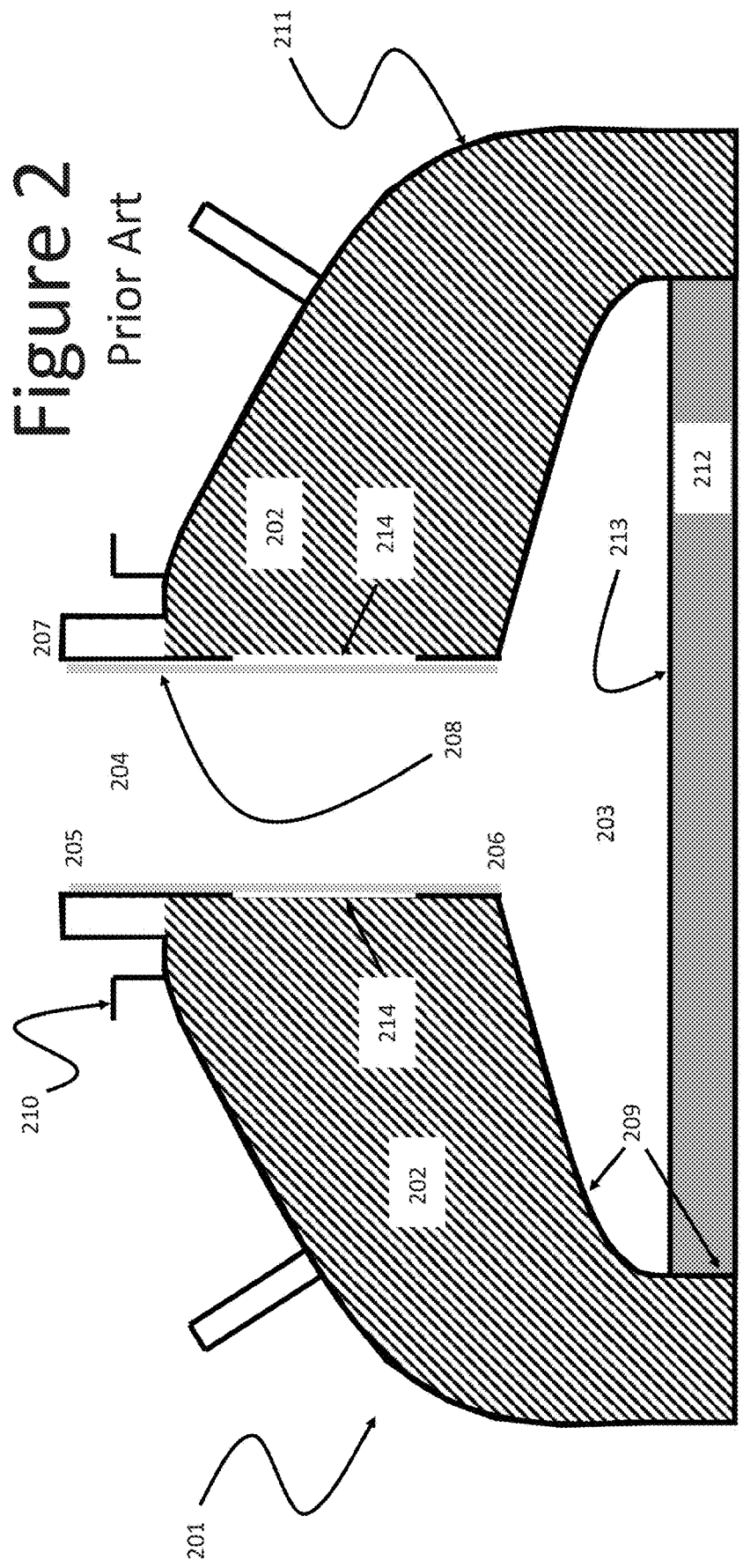

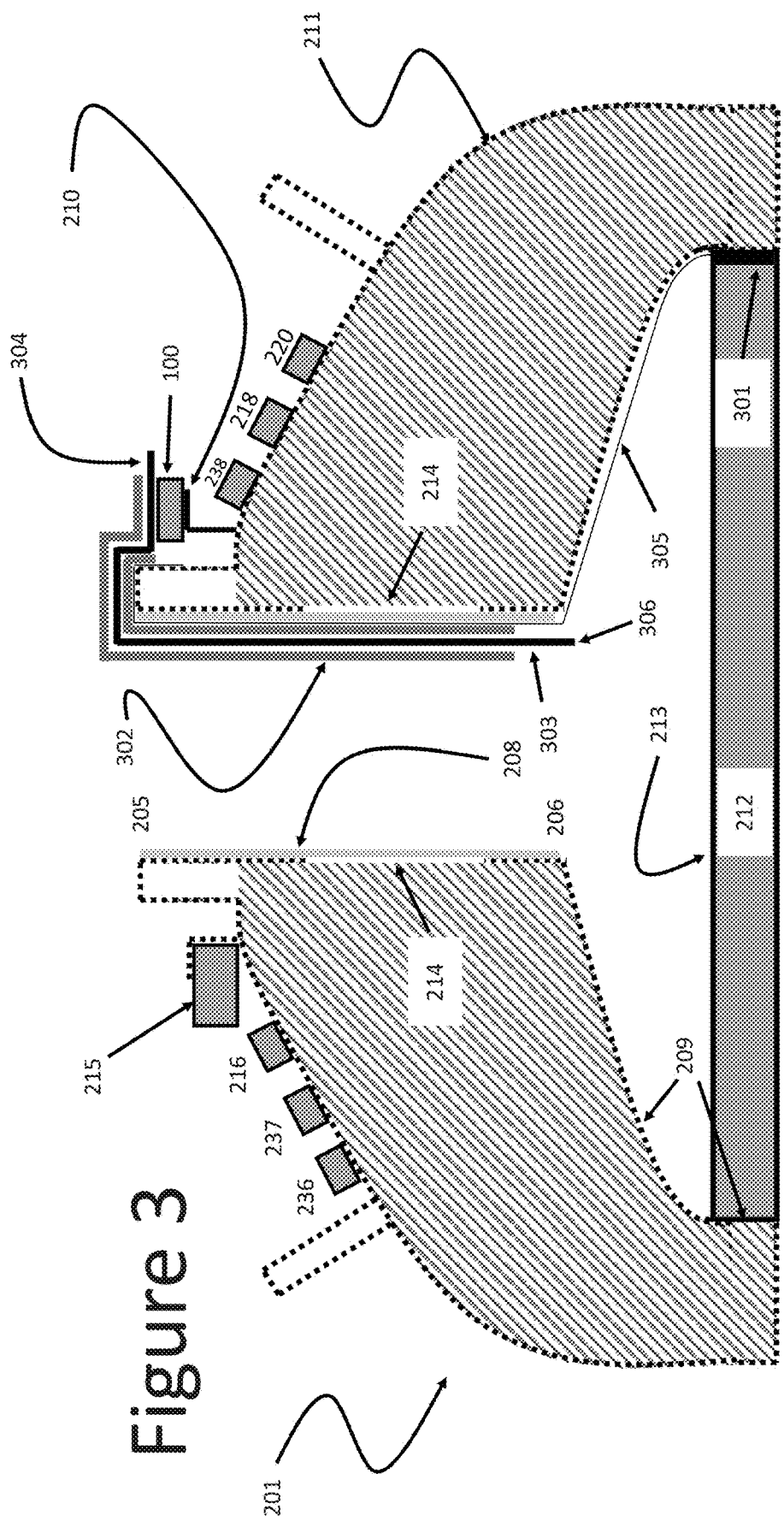

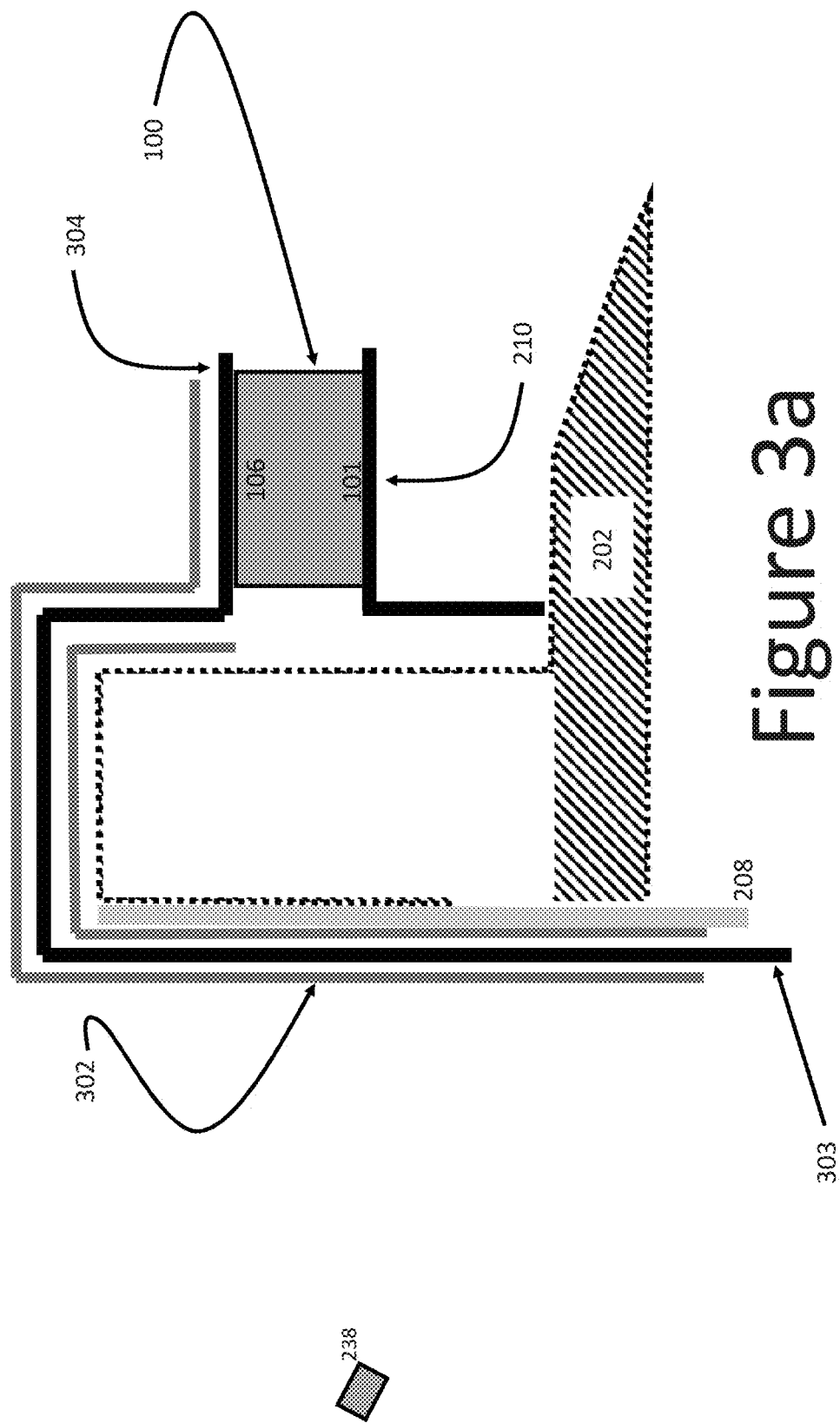

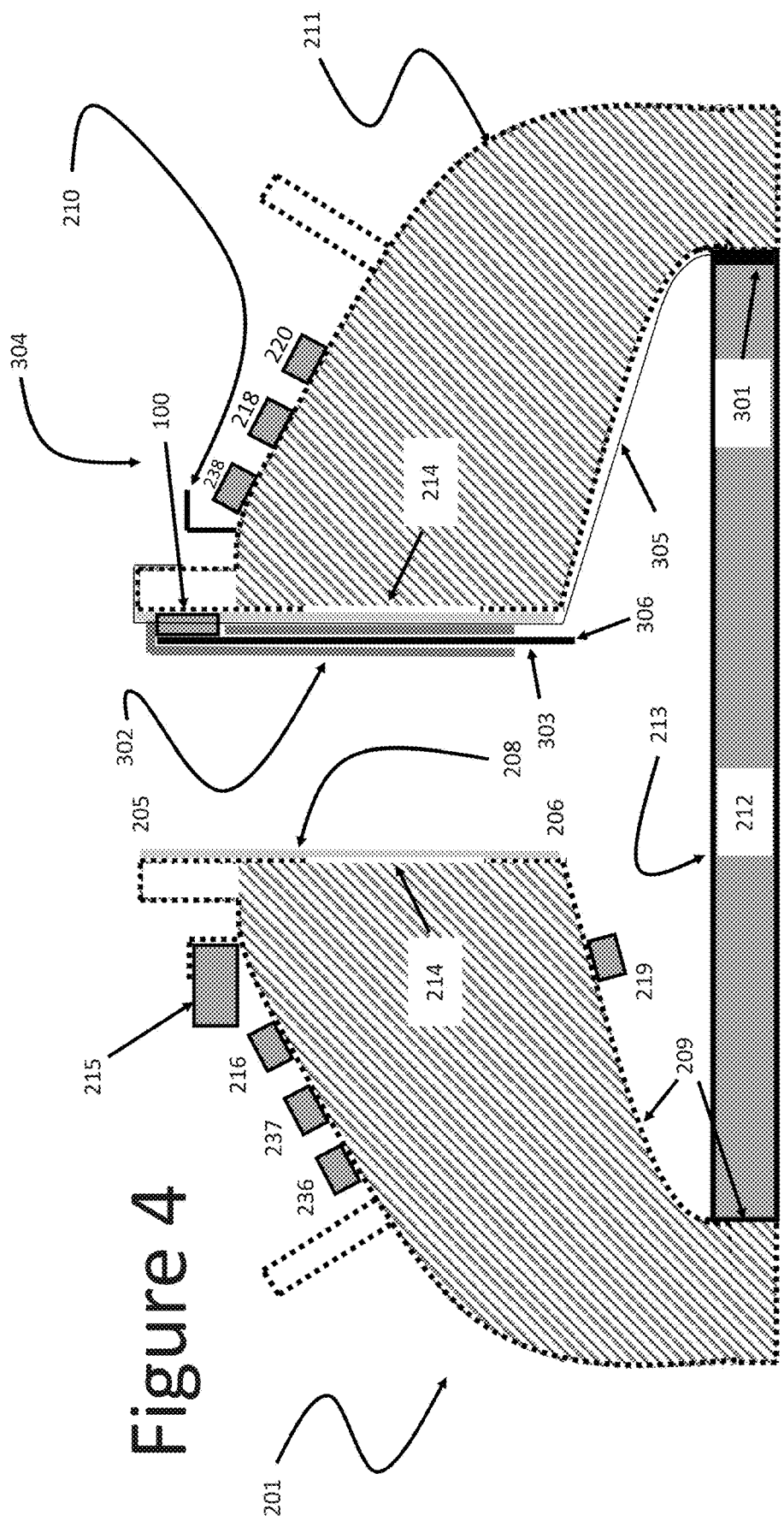

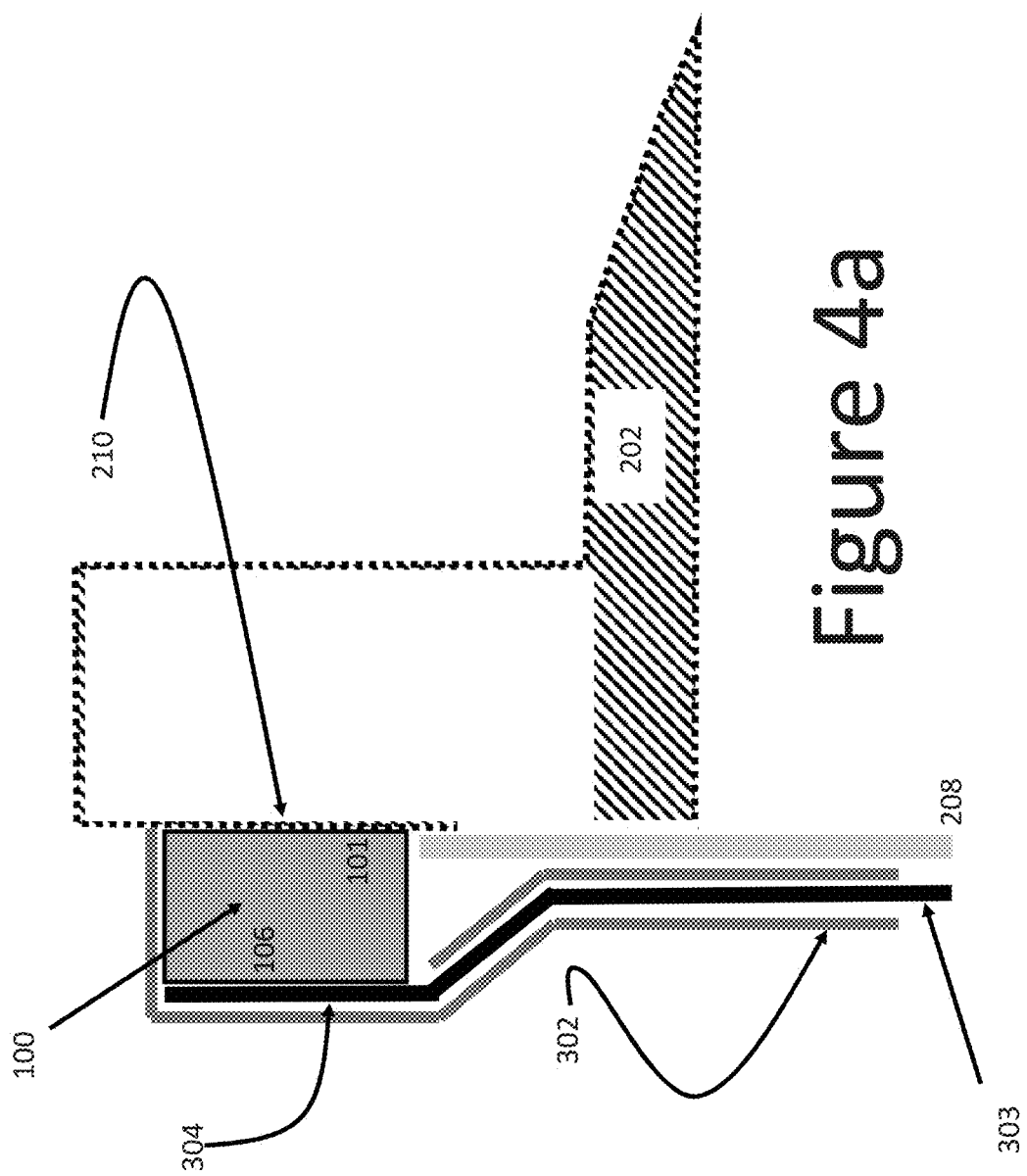

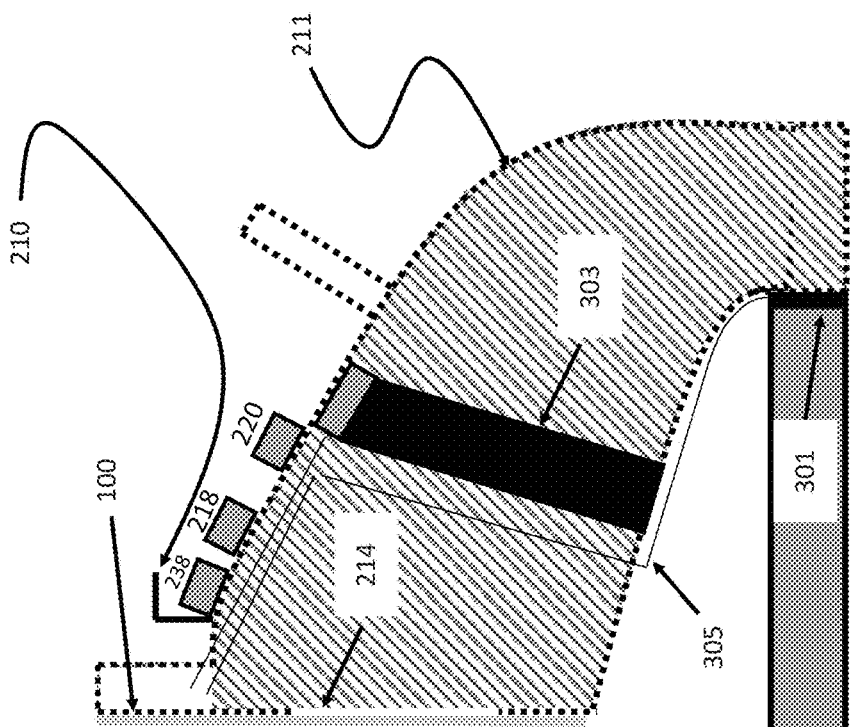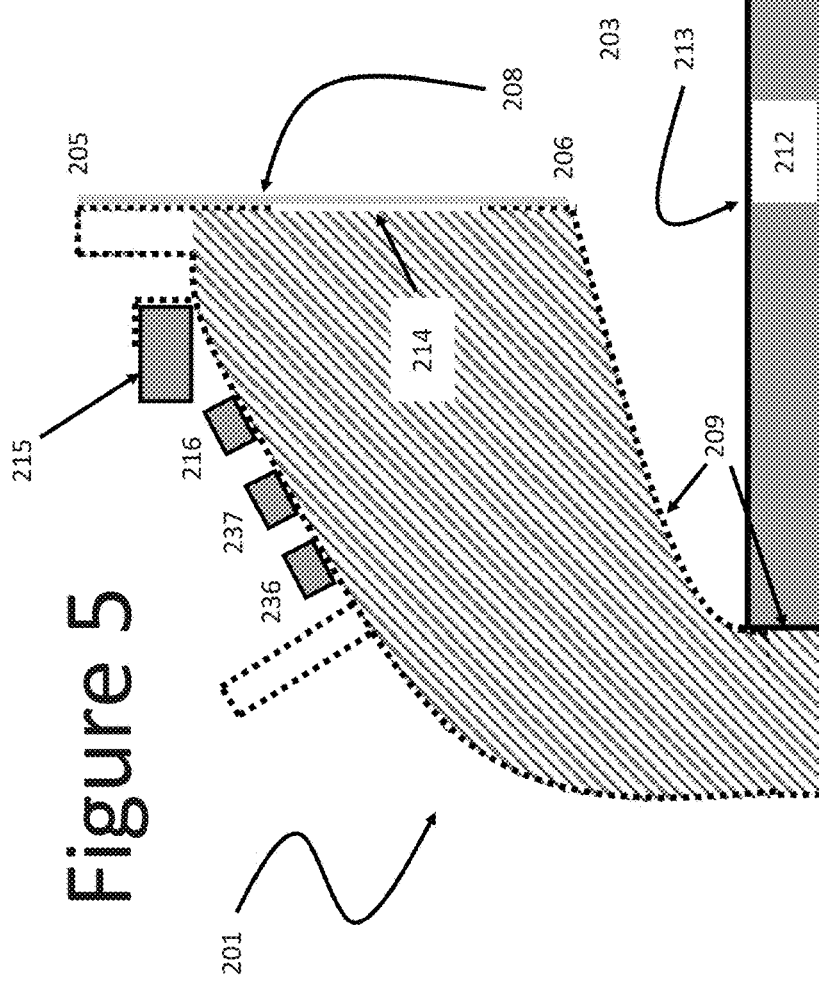
Figure 5

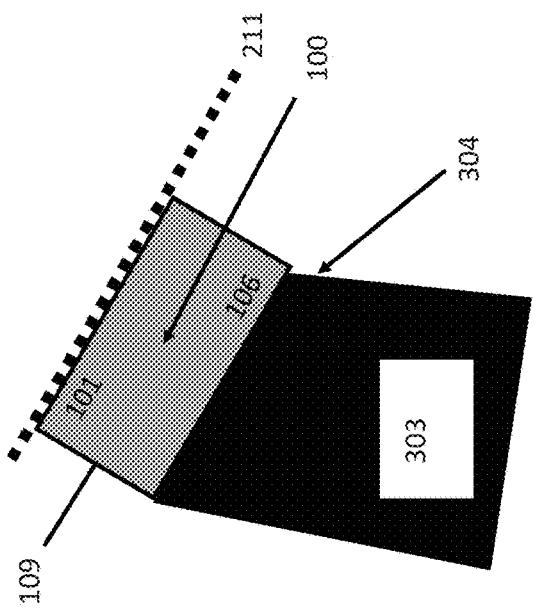
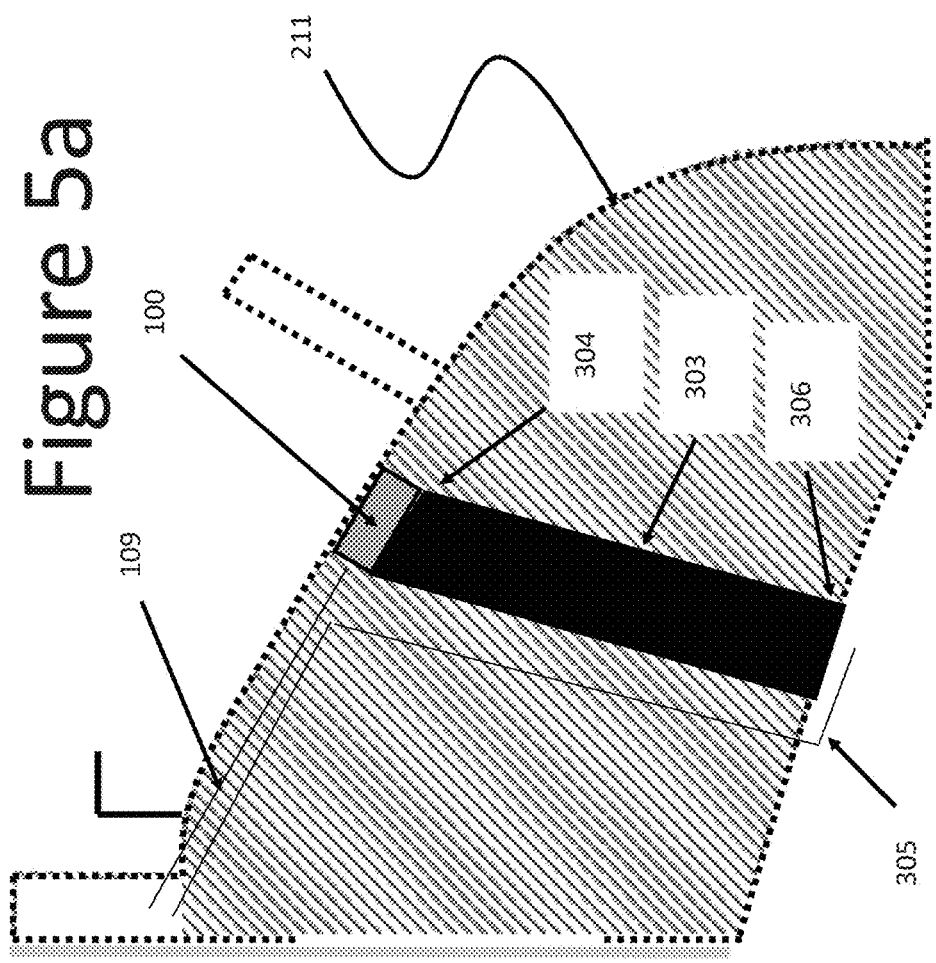

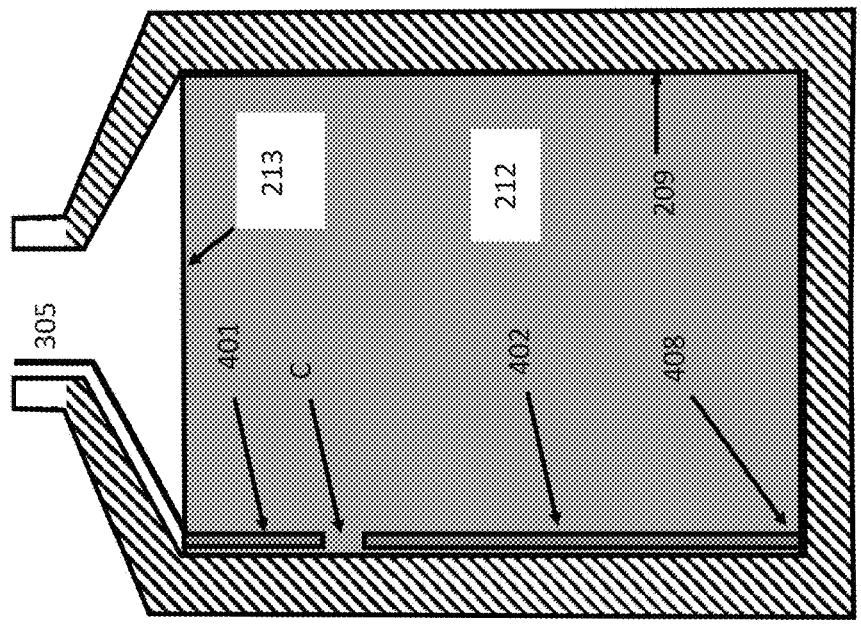
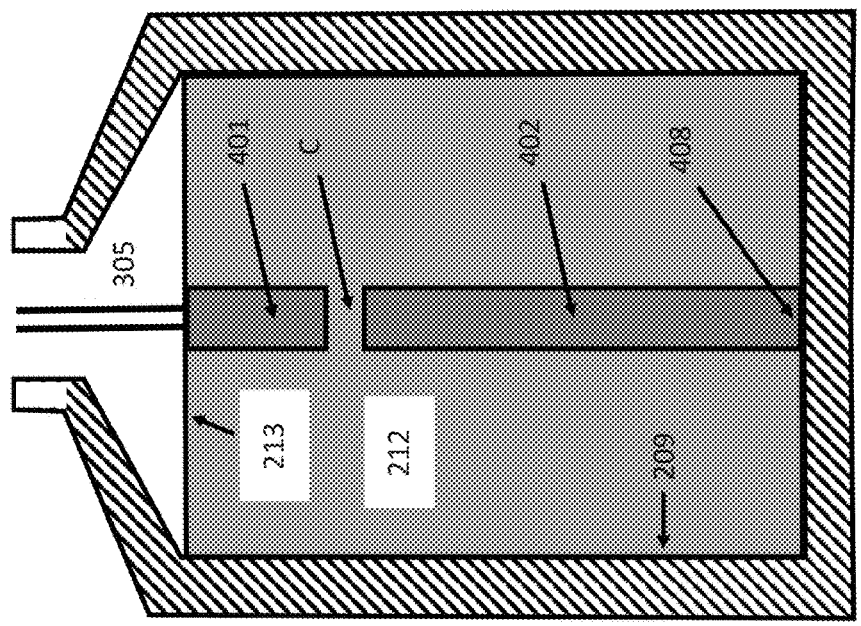
Figure 7a Section X-X
Figure 7b Section Y-Y

Section Y-Y

Section X-X

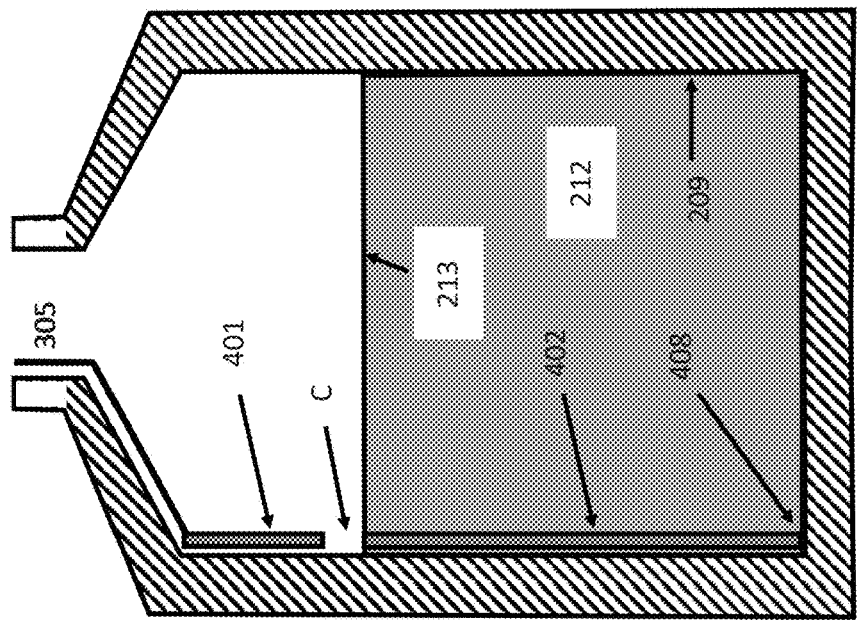
Figure 7f
Section Y-Y
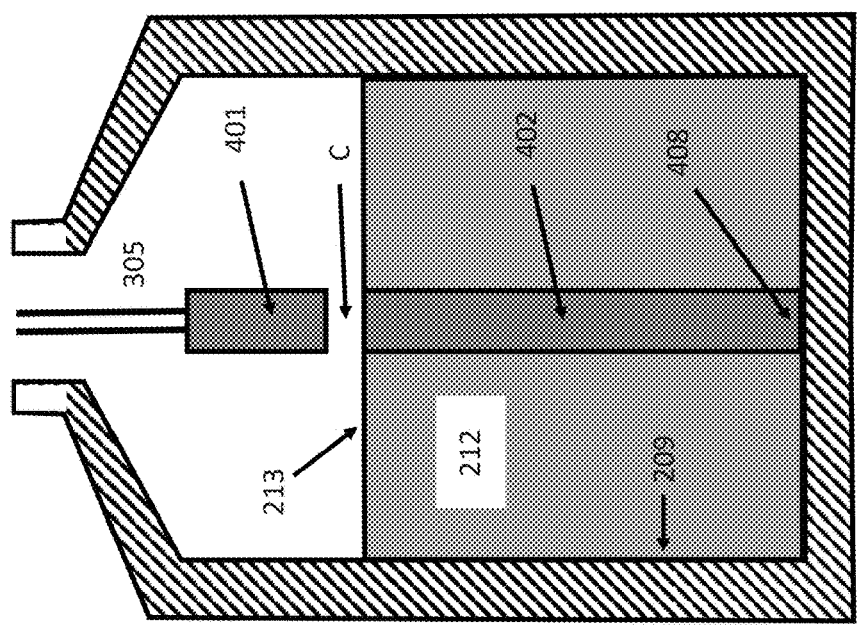
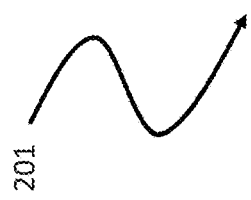
Figure 7e
Section X-X

IOT SYSTEM FOR RETURNABLE ASSET CONTAINING CRYOGENIC LIQUID

CROSS REFERENCE TO RELATED APPLICATIONS

This application claims the benefit of priority under 35 U.S.C. § 119 (a) and (b) to US Provisional Patent Application No. 62/916,033, filed Oct. 16, 2019, the entire contents of which are incorporated herein by reference.

BACKGROUND

A typical dewar includes an inner tank for retaining the cryogenic fluid, such as liquid nitrogen, and biological specimens and an outer wall surrounding and spaced from the inner tank. The space between the tank and the outer wall is typically either at a vacuum, packed with insulating material, or commonly both.

Cryobiological storage dewars are used to store heat sensitive products such as biological specimens at temperatures typically between −90° C. and −196° C. For example, such a dewar may contain vaccines. A dewar full of animal vaccines may be worth more than $20,000 US. A dewar full of human vaccines may be worth much more than $1,000,000 US. These vaccines must be maintained at cryogenic temperatures to ensure their efficacy. Often, especially with animal vaccines, these dewars may be stored locally for extended periods of time before, or between, uses. This may be weeks, or even months, stored in potentially high ambient temperature environments.

To maintain the required low temperature, it is necessary to maintain a minimum level of cryogenic liquid in the dewar. Over time, however, heat transfer between the external environment and the cryogenic liquid will case the liquid to vaporize. This will naturally case the level of cryogenic liquid in the dewar to be reduced. The ability to track the rate of cryogenic liquid reduction is important with respect to timing the refilling of the dewar with new cryogenic liquid.

One problem is that it is difficult to accurately measure and monitor the cryogenic liquid level over extended periods of time. State-of-the-art liquid measurement devices operate on battery power. While the power drain on modern circuits is very low, the total energy stored in these batteries is limited. Especially if there is the very desirable telemetry being employed.

There exists a need in the industry for accurate on-site measurements of the cryogenic contents of dewars, and a need for providing power to the on-board electronics for extended periods of time.

SUMMARY

A method of providing electrical energy to a dewar containing a cryogenic liquid is provided. The method includes introducing an insulated heat pipe, with a distal end and a proximal end, into a cryogenic dewar comprising an exterior surface. And providing a Seebeck module, with a cold junction and a hot junction. The distal end is in thermodynamic contact with a cryogenic fluid or gas and the proximal is thermodynamically connected to the cold junction. The hot junction is thermodynamically connected to the exterior surface of the dewar, thereby producing an electrical flow in the Seebeck module. The energy produced is collected by an energy harvester and stored in an energy storage unit such as rechargeable battery or supercapacitors. At least a portion of the electrical power is used to power a central processing unit. Central processing unit may be connected to the Internet of Things network.

A method of calibrating a level probe in a dewar containing a cryogenic liquid is provided. The method includes a capacitive level probe having at least two separated segments. The first segment having a proximal end and a distal end at a first predetermined location, and the second segment having a proximal end at a second predetermined location. The first location and the second location are separated by a calibration gap (C). The capacitive level probe provides a discontinuous reading when the liquid level is within the calibration gap (C). A first capacitance reading is made from the capacitive level probe when the dewar is full and the cryogenic liquid is at a level at or above the proximal end of the first segment. A second capacitance reading is made when the cryogenic liquid is at a level corresponding to a location within the calibration gap. The level probe is calibrated by utilizing the first capacitance reading and the second capacitance reading.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein:

FIG. 2 is a schematic cut-away view of a dewar, as is known in the art.

FIG. 3 is a schematic cut-away view of a dewar, in accordance with one embodiment of the present invention.

FIG. 3a is a close-up schematic cut-away view of the neck of a dewar, in accordance with one embodiment of the present invention.

FIG. 4 is a schematic cut-away view of a dewar, in accordance with one embodiment of the present invention.

FIG. 4a is a close-up schematic cut-away view of the neck of a dewar, in accordance with one embodiment of the present invention.

FIG. 5 is a schematic cut-away view of a dewar, in accordance with one embodiment of the present invention.

FIG. 5a is a close-up schematic cut-away view of the neck of a dewar, in accordance with one embodiment of the present invention.

FIG. 5b is a close-up schematic cut-away view of a dewar, in accordance with one embodiment of the present invention.

FIG. 7a is a schematic cut-away view of a dewar illustrating the X-X section, with the dewar 100% full of cryogenic liquid, in accordance with one embodiment of the present invention.

FIG. 7b is a schematic cut-away view of a dewar illustrating the Y-Y section, with the dewar 100% full of cryogenic liquid, in accordance with one embodiment of the present invention.

FIG. 7e is a schematic cut-away view of a dewar illustrating the X-X section, with the minimum level of cryogenic liquid where 75% will be read, in accordance with one embodiment of the present invention.

FIG. 7f is a schematic cut-away view of a dewar illustrating the Y-Y section, with the minimum level of cryogenic liquid where 75% will be read, in accordance with one embodiment of the present invention.

ELEMENT NUMBERS

Figure 1:
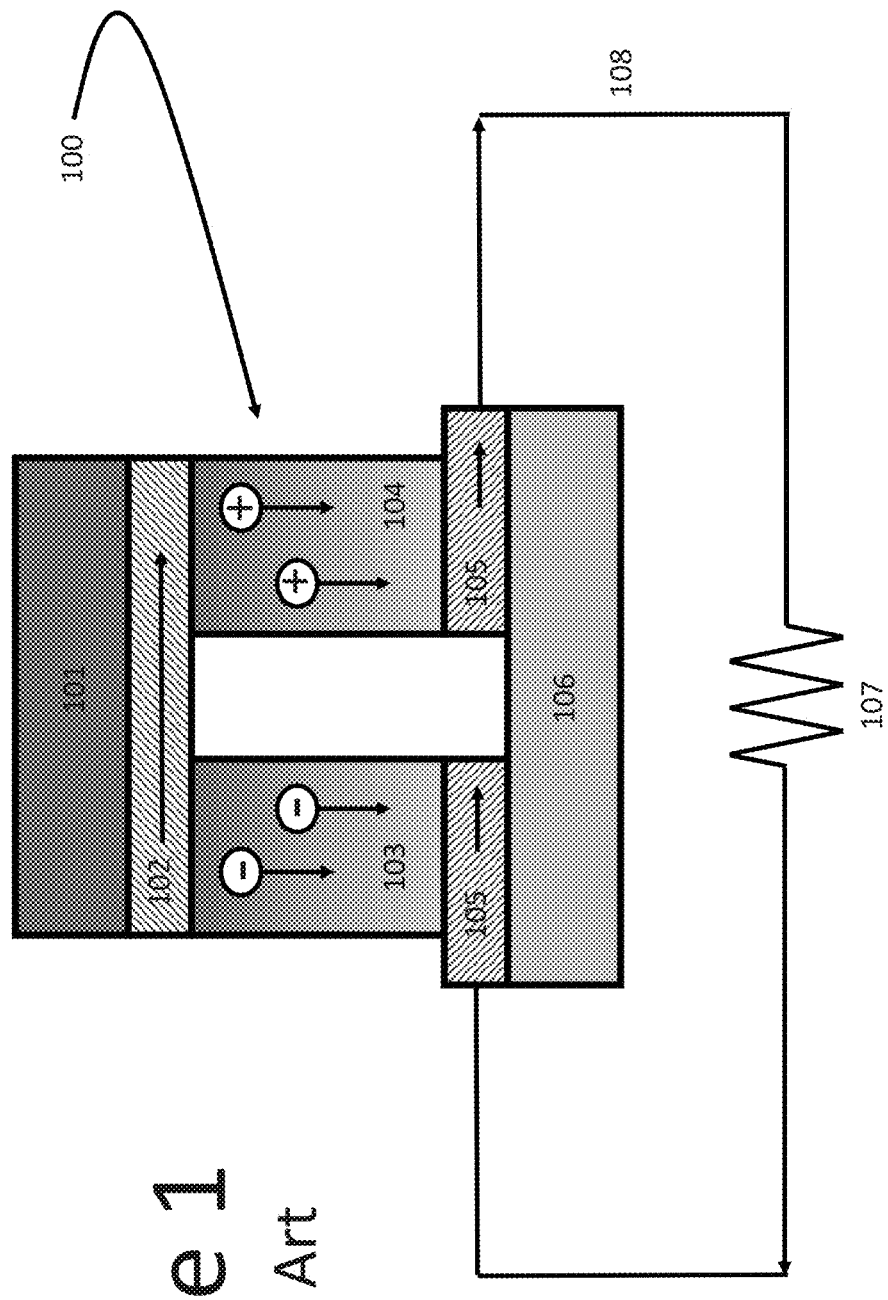
FIG. 1 is a schematic representation of a Seebeck Module, as is known in the art.

100=Seebeck Module
101=Heat Source
102=Hot Junction
103=Negative Polarity Node (n-doped semiconductor)
104=Positive Polarity Node (p-doped semiconductor)
105=Cold Junction
106=Heat Sink (cold side)
107=Electrical Resistance (load)
108=Electrical Current
109=Seebeck module wires
201=Dewar
202=Insulation/Vacuum Region
203=Interior Volume
204=Neck Interior Volume
205=Upper End of Neck Interior Volume
206=Lower End of Neck Interior Volume
207=Upper Surface of Neck
208=Interior Surface of Neck (Plastic)
209=Interior Surface of the Interior Volume
210=Metal Collar
211=Exterior Surface of Dewar (external shell)
212=Stored Liquid
213=Surface of Stored Liquid
214=Gap Disconnecting Thermodynamically the Outer Shell from the Inner Tank
215=Central Processing Unit
216=Accelerometer
218=External Temperature Sensor
219=Internal Temperature Sensor
220=Data Logger (Data Storage Memory)
221=Electrical Connection between the Energy Storage Unit and Level Probe.
222=Electrical Connection between the Energy Storage Unit and Accelerometer.
223=Electrical Connection between Seebeck Module and Energy Harvester
224=Electrical Connection between the Energy Storage Unit and External Temperature Sensor
225=Electrical Connection between the Energy Storage Unit and Internal Temperature Sensor
226=Electrical Connection between the Energy Storage Unit and Data Logger (Data Storage Memory)
227=Data Connection between Level Probe and Central Processing Unit.
228=Electrical Connection between Energy Harvester and Energy Storage Unit
230=Data Connection between External Temperature Sensor and Central Processing Unit.
231=Data Connection between Internal Temperature Sensor and Central Processing Unit.
232=Data Connection between Data Logger (Data Storage Memory) and Central Processing Unit.
233=Electrical Connection between the Energy Storage Unit and Central Processing Unit.
234=Data Connection between Central Processing Unit and the Internet of Things network
235=the Internet of Things network
236=Energy Harvester
237=Energy Storage Unit
238=Container Opening Sensor
239=Electrical Connection between the Energy Storage Unit and Container Opening Sensor
240=Data Connection between Container Opening Sensor and Central Processing Unit
301=Level Probe
302=Heat Pipe Insulation
303=Heat Pipe
304=Proximal End of Heat Pipe (connected to Seebeck Module)
305=Level Probe Wires to Electronics
306=Distal end of Heat Pipe (exposed to cryogenic fluid or vapor)
401=First Segment (of Level Probe)
402=Second Segment (of Level Probe)
403=Outer Layers (of Level Probe)
404=Inner Layer (of Level Probe)
405=First Segment Proximal End
406=First Segment Distal End
407=Second Segment Proximal End
408=Second Segment Distal End
A=Overall Length of Level Probe
B=Length of First Segment
C=Length of Gap Between First Segment and Second Segment

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As used herein, a "Seebeck Module" is defined as a solid-state device that converts a temperature difference directly into electrical energy. A Seebeck Module takes advantage of the Seebeck Effect.

As used herein, the term "heat pipe" is defined as a conductive heat-transfer device, typically a metallic strip, bar, tube, or pipe. Heat pipe 303 may be composed of copper or aluminum, but other highly heat conductive metals may also be used. Much of the length of heat pipe 303 may be insulated 302 to discourage heat loss and enhance heat transfer along the entire length.

As used herein, the term "wireless" is defined as a system for electronic transfer of information between two points that are not connected by an electrical conductor, Non-limiting examples of wireless communication are Bluetooth, IEEE 802 LAN protocols (such as Zigbee), Global System for Mobile Communications (GSM), Sigfox, and LoRaWAN.

As used herein, the term "central processing unit" is defined as an electronic circuit that retains programming, executes instructions, and stores information. Non-limiting examples of a central processing unit are microcomputer, systems on a chip (SoC), a programmable logic controller (PLC), a single-board microcontroller, an Arduino, or a Raspberry PI.

As used herein, the term "internet of things" is defined as an or all physical objects that are embedded with sensors, software, or other technologies for the purpose of connecting and exchanging data with other such devices and systems over the Internet. This connection and data exchange may take place wirelessly.

The Seebeck effect utilizes semiconductors that are modified (doped) in particular ways. On one side of the Seebeck Module there is a semiconductor pathway that is p-doped. This means that it has been chemically modified to be able to allow an additional electron to become attached. This allows this side of the Seebeck Module to become negatively charged.

On the other side of the Seebeck Module there is a semiconductor pathway that is N-doped. Similar to above, this allows an electron to be removed. This then allows this side of the Seebeck Module to become positively charged.

This electron activity is motivated by a temperature difference across the pathways. If a sufficient temperature difference is present, the resulting electromotive force produces useful electrical current.

The present invention will now be discussed with reference to FIGS. 1-7f.

FIG. 1 illustrates a typical Seebeck Module 100 as is known in the art. Heat source 101 is physically connected to hot junction 102. Hot Junction 102 is connected to both the n-doped semiconductor, negative polarity node 103, and the p-doped semiconductor, positive polarity node 104. On the "cold end" of negative polarity node 103 is one part of cold junction 105. The other part of cold junction 105 is attached to the "cold end" of positive polarity node 104, The two parts of cold junction 105 are both physically attached to heat sink 106. Once heat source 101 is attached to an adequate heat source, and heat sink 106 is attached to an adequate heat sink, the Seebeck Effect will occur. This will generate current 108, that may be used to produce work in electrical resistance, or load, 107. Thus, the temperature difference between the heat source and the heat sink is directly converted into electrical energy.

Turning to FIG. 2, a cut-away schematic diagram of a dewar (also known as a dewar flask or a dewar bottle) 201 having an interior volume 203 as known in the art is illustrated. This is an insulated storage vessel that allows storage and transport of either very hot or very cold liquids 212. Such a dewar 201 will typically have a vacuum insulated region 202, thereby allowing the interior volume 203 to be filled with, for example, very cold cryogenic liquid. The insulated region 202 need not necessarily be vacuum insulated, but may also be filled with any type of appropriate thermal insulation known in the art.

Dewar 201 has a neck, with an interior volume 204, the interior surface of the interior volume 209, and an upper surface 207. The neck has an interior surface 208. The interior of the neck has an upper end 205 and a lower end 206. The upper end 205 is defined as the end closest to the opening through which liquid enters or exits the interior volume 203. The lower end 206 is defined as the end closest to the liquid 212 stored within the interior volume 203. Surrounding the neck and attached to the outer surface 211 of the dewar 201 is a metal collar 210. In order to minimize the amount of heat that is conducted from the outer surface 211 to the interior surface 209, there is a thermal gap, or disconnection, 214 in the dewar metal skin. Thermal gap 214 is covered by a plastic, or non-conductive, interior surface 208.

FIGS. 3, 3a, 4, and 4a illustrate non-limiting examples of the utilization of the present invention as a retrofit into existing dewars. FIGS. 5, 5a and 5b illustrates a non-limiting example of the addition of the present invention during the fabrication of the dewar.

Turning to FIGS. 3 and 3a, a cut-away schematic diagram of dewar 201 with a Seebeck Module 100 attached externally is shown, in accordance with one embodiment of the present invention. A level probe 301 is located in close proximity to the vertical part of the inside surface 209 of the interior volume 203.

Heat pipe 303 has a distal end 306 that is located in the interior volume 203. Heat pipe 303 then travels up the interior surface 208 and out the upper end 205 of the dewar neck. Heat pipe 303 may then pass over upper surface 207 of the neck, where it may then connect to the heat sink 106 of Seebeck Module 100. Heat pipe 303 may be insulated 302 for most of the distance between the connection with the Seebeck Module 100 and distal end 306. In this embodiment Seebeck Module 100 is located such that the heat source 101 is directly, physically connected to the metal collar 209 or the upper metallic part of neck surface 208 (under the plastic part), which allows the entire external shell 211 of the dewar 201 to act as a heat source.

Ideally, during equilibrium condition of steady-state conducting, the spatial temperature gradient along the length of heat pipe 303 is constant. Under such conditions, all of the heat energy entering the hot end of heat pipe 303 then exits the cold end.

Figure 3B:
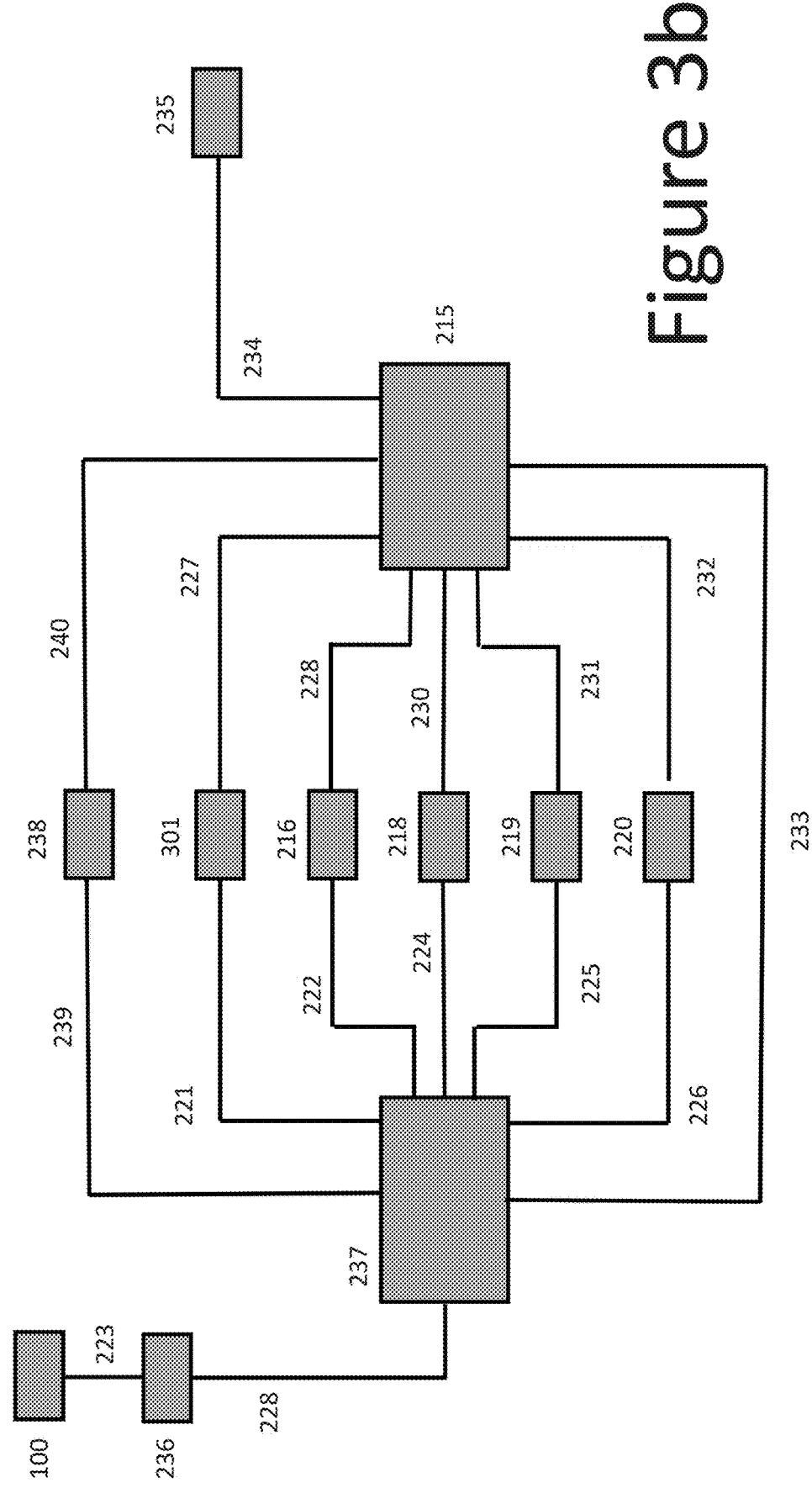
FIG. 3b is a schematic representation of the electrical and data interconnections in the system, in accordance with one embodiment of the present invention.

Turning to FIG. 3b, the energy produced in Seebeck Module 100 may be collected by an energy harvester 236 and stored in an energy storage unit 237 such as rechargeable battery or supercapacitors. At least a portion 233 of the electrical power is used to power a central processing unit 215. Central processing unit 215 may be connected to the Internet of Things network 235. At least a portion 221 of the electrical energy may be used to power level probe 301. At least a portion 222 of the electrical energy may be used to power an accelerometer 216. Accelerometer 216 may measure the orientation of dewar 201 or any shock to dewar 201. At least a portion 224 of the electrical energy may be used to power an external temperature sensor 218. At least a portion 225 of the electrical energy may be used to power an internal temperature sensor 219. At least a portion 226 of the electrical energy may be used to power a data storage memory or data logger 220. At least a portion 239 of the electrical energy may be used to power a container opening sensor 238. Container opening sensor 238 detects the opening of dewar 201. At least a portion 233 of the electrical energy may be used to power central processing unit 215.

Level probe 301 may be connected 227 to central processing unit 215. Accelerometer 216 may be connected 228 to central processing unit 215. External temperature sensor 218 may be connected 230 to central processing unit 215. Internal temperature sensor 219 may be connected 231 to central processing unit 215. Data storage memory or data logger 220 may be connected 232 to central processing unit 215. Container opening sensor 238 may be connected 240 to central processing unit 215. Central processing unit 215 may be connected 234 to the Internet of Things network 235. The electrical and central processing connections are typical for FIGS. 3, 4, and 5.

Turning to FIGS. 4 and 4*a*, a cut-away schematic diagram of dewar 201 with a Seebeck Module 100 attached internally is shown, in accordance with one embodiment of the present invention. A level probe 301 is located in close proximity to the vertical part of the inside surface 209 of the interior volume 203.

Heat pipe 303 has a distal end 306 that is located in the interior volume 203. Heat pipe 303 then travels up the interior surface 208, where it may then be connected to the heat sink 106 of Seebeck Module 100, which is located on the inside of dewar 201. Much of the length of heat pipe 303 may be insulated 302 to discourage heat loss and enhance heat transfer along the entire length. In this embodiment Seebeck Module 100 is located such that the heat source 101 is directly, physically connected to the exterior surface, or external shell, 211. A portion of the plastic interior surface of the neck 208 is removed so that the heat source 101 is directly, physically connected to the metal comprising the exterior surface 211, from the inside of the dewar 201. This allows the entire external shell 211 of the dewar 201 to act as a heat source.

Ideally, during equilibrium condition of steady-state conducting, the spatial temperature gradient along the length of heat pipe 303 is constant. Under such conditions, all of the heat energy entering the hot end of heat pipe 303 then exits the cold end.

As discussed above, Seebeck module 100 requires a temperature differential to produce electrical power. In this case, this temperature differential is provided by the liquid content 212 of dewar 201 which is very cold and the outside ambient temperature which is relatively warm. The outer shell 211 of the dewar 201 is used as the hot side 101 for Seebeck module 100. The outers shell 211 acts as a huge heat sink having a large mass that will stabilize the temperature since Seebeck module 100 will "try" to bring down the temperature of the hot junction 102.

Seebeck module 100 hot side is put in contact with the dewar outer shell 211. Cold side 106 of Seebeck module 100 is connected to the isolated "heat pipe" 303 that goes through the opening into the inside the dewar 201. Heat pipe 303 will refrigerate Seebeck module 100 using the cryogenic temperature of the dewar content 212.

Depending on the cryogenic liquid being stored and transported, the cold end of heat pipe 303 may experience temperatures ranging from −269 C. (liquid helium), −196 C. (liquid nitrogen), and −186 C. (liquid argon). The hot end of heat pipe 303 will essentially be whatever the ambient temperature is where the dewar 201 is being stored and/or utilized. As such, the hot end of heat pipe 303 may experience temperatures ranging from −40 C. to 45 C., more typically this temperature may range from 10 C. to 35 C.

These temperature differences are sufficient to allow Seebeck Module 100 to generate a useful amount of electrical energy. At least a portion of the electrical energy may be used to charge a lithium battery or supercapacitor and therefore power the dewar 201 IoT. Thus, avoiding the need for disposable batteries their recurring replacement. Depending on circumstances, as system as described above could provide sufficient electrical power for 10 years or more when cryogenic liquid is present.

Turning to FIGS. 5, 5*a*, and 5*b*, a cut-away schematic diagram of dewar 201 with a Seebeck Module 100 attached externally is shown, in accordance with one embodiment of the present invention. In this embodiment, Seebeck Module 100, heat pipe 303, level probe wire 305, and Seebeck Module wire 109, are integrated into dewar 201, preferably while dewar 201 is being fabricated.

A level probe 301 is located in close proximity to the vertical part of the inside surface 209 of the interior volume 203. Level probe wire 305 connects to level probe 301 and exits dewar 201.

Heat pipe 303 has a distal end 306 that is located in the interior volume 203. Heat pipe 303 passes through insulation/vacuum region 202 of dewar 201. Proximal end 304 of heat pipe 303 is connected to the heat sink 106 of Seebeck Module 100. In this embodiment Seebeck Module 100 is preferably also located inside dewar 201, in the insulation/vacuum region 202, and is positioned such that the heat source 101 is directly, physically connected to the entire external shell 211 of the dewar 201, which acts as a heat source. Seebeck Module wire 109 connects to Seebeck Module 100 and exits dewar 201.

Figure 6:
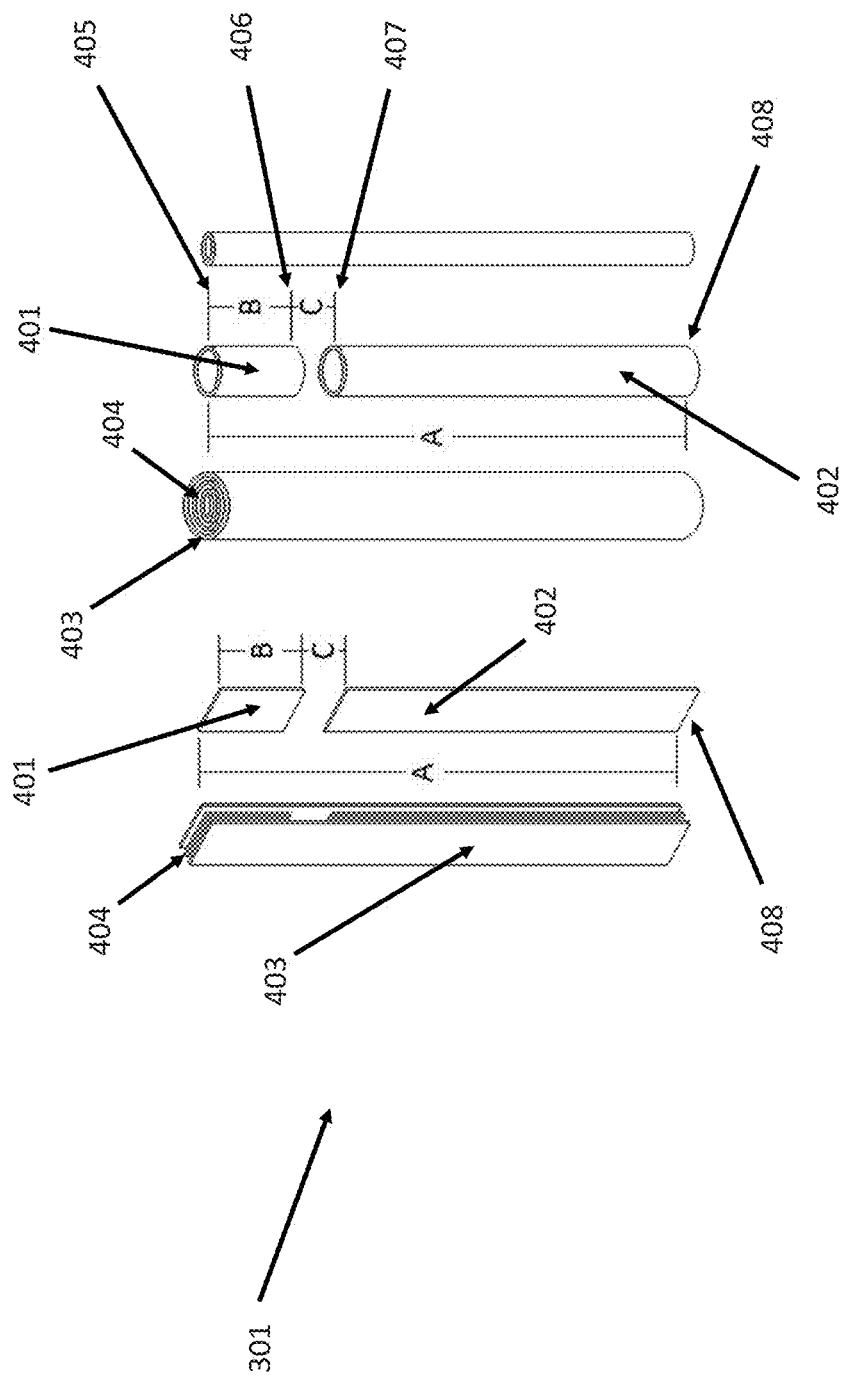
FIG. 6 is a schematic representation of level probe, in accordance with one embodiment of the present invention.

Turning to FIG. 6, two possible embodiments of the level probe 301 are illustrated in detail. These embodiments are not intended to be exhaustive, and other embodiments are possible. These are provided for descriptive purposes.

As illustrated, the level probe 301 may be made of flat pieces or may be fashioned as a series of concentric tubes. Each level probe 301 may comprise a first segment 401 and a second segment 402. The first segment 401 and second segment 402 may be separated by a gap C. The first segment 401 and second segment 402, separated by gap C, may then be located, in between two layers 403 as inner layer 404.

As mentioned before, level probe 301 is preferably a capacitance type probe. In this case, the first segment 401 and second segment 402 electrically connected act as one of the capacitor plates. The metallic outer layers 403 acts as the other capacitor plate. Insulation between the inner layer and the outer layers prevent direct electrical contact between layers but the liquid must be able to circulates freely between layers over most of the surface. The cryogenic liquid and/or vapor within the probe 301 acts as the dielectric.

Figure 7:
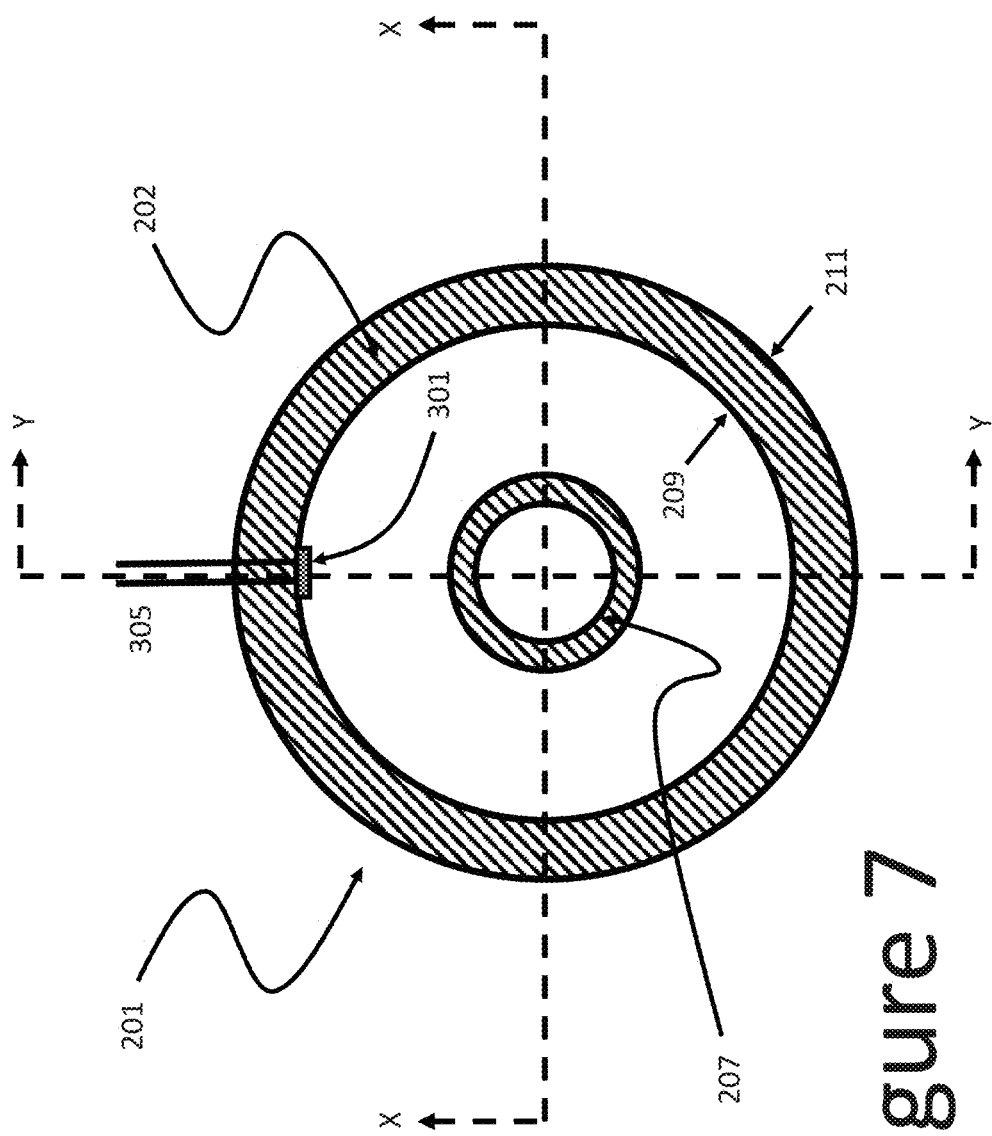
FIG. 7 is a schematic plan view of a dewar, illustrating X-X and Y-Y orientations, in accordance with one embodiment of the present invention.
Figure 7D:
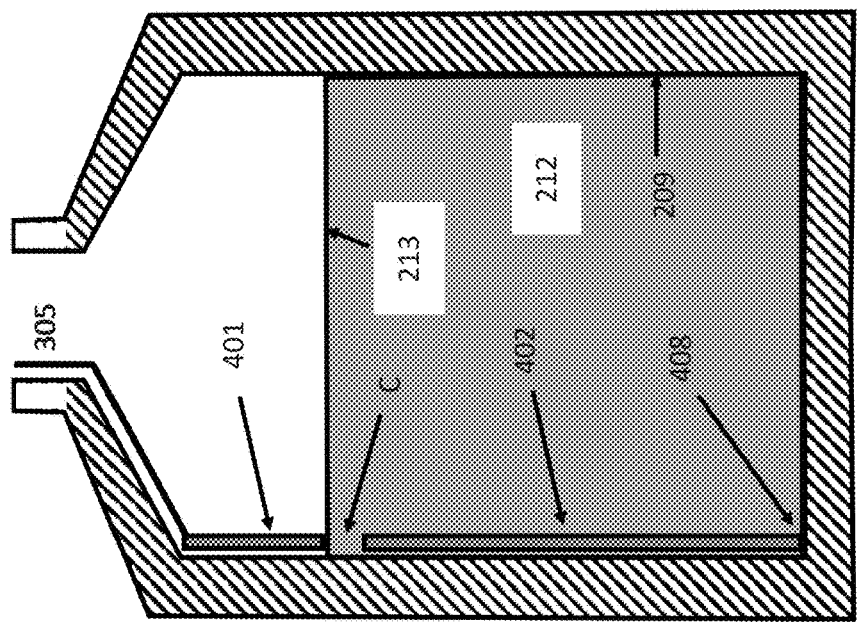
FIG. 7d is a schematic cut-away view of a dewar illustrating the Y-Y section, with the maximum level of cryogenic liquid where 75% will be read, in accordance with one embodiment of the present invention.
Figure 7C:
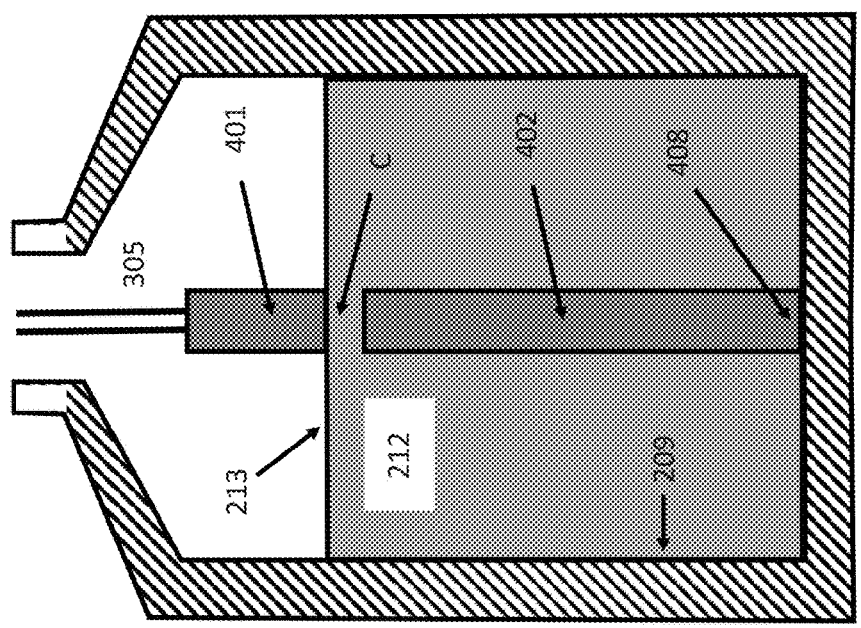
FIG. 7c is a schematic cut-away view of a dewar illustrating the X-X section, with the maximum level of cryogenic liquid where 75% will be read, in accordance with one embodiment of the present invention.

Turning to FIGS. 7, and 7*a*-7*f*, the purpose of gap C in level probe 301 is explained. In the interest of clarity, in FIGS. 7*a*-7*f*, only first segment 401 and second segment 402 of level probe 301 are illustrated. It is understood that outer layers 403 are also present. FIG. 7 is simply a general plan view of dewar 201, provided for orientation purposes. FIGS. 7*a*, 7*c*, and 7*e* are cut-away views of dewar 201 illustrating section X-X, as defined in FIG. 6. FIGS. 7*b*, 7*d*, and 7*f* are cut-away views of dewar 201 illustrating section Y-Y, as defined in FIG. 7.

Level probe 301 may be a capacitance level probe and thus may be very sensitive and may require careful calibration. The purpose of gap C is to provide such calibration. As illustrated in FIGS. 7*b*, 7*d*, and 7*f*, level probe wires 305 and the level probe 301 (here, illustrated without the outer layers) generally follow the profile and shape of the neck interior 208 and the inner wall 209 of the dewar 201.

FIGS. 7*a* and 7*b* illustrate dewar 201, immediately after having been fully filled with cryogenic liquid 212. At this stage, which may be designated as time T=0, cryogenic liquid surface 213 is the level probe 301. In particular, at this time, cryogenic liquid 212 is in contact with the entire surface of the level probe 301. The space between the probe's layers is entirely filled with liquid. Level probe may be a capacitance level probe, in which case at T=0, the capacitance reading at full volume is then known.

As cryogenic liquid 212 vaporizes, cryogenic liquid surface 213 begins to lower within the dewar 201. As indicated in FIGS. 7c and 7d, at what may be designated as time T=1, cryogenic liquid surface 213 loses contact with the surface of first segment 401, and begins to enter the region indicated by gap C. At this point in time, the capacitance reading will remain constant until cryogenic liquid surface 213 passes through gap C. This is because as the cryogenic liquid surface 213 passes through gap C, the capacitance reading is only dependent on second segment 402, which remains fully submerged during this entire time.

As indicated in FIGS. 7e and 7f, at what may be designated as time T=2, cryogenic liquid surface 213 exits gap C and begins to reduce contact with the surface of second segment 402. At this point in time, the capacitance reading will once again change as the level of cryogenic liquid surface 213 drops.

The length B of the first segment 401 may be defined, and fabricated, as being 25% of the overall length A of the level probe 301. This percentage may be any value as long as this value is defined and known. With the capacitance reading at T=0, at which time it is known that the dewar 201 is 100% full, and the capacitance reading between T=1 and T=2, at which time it is known that the dewar 201 is 75% full, the level probe may then be calibrated real-time. Thus, once the cryogenic liquid surface 213 passes through gap C and makes contact with the proximal end 407 of the second segment 402, the remaining volume of the dewar 201 may be determined from the capacitance reading of the now-calibrated level probe 301.

Therefore, to reiterate, level probe 301 is vertically situated along inner wall 209 of dewar 201. Level probe 301 has two segments 401/402 separated by a notch C. Level probe 301 may be a capacitance level probe, and the output is analog. When dewar 201 is full, the reading of the level is not changing. This will associate the analog reading of level probe 301 with the physical level of dewar 201 when full. As soon as liquid level 213 reaches the top of level probe 405, the capacitance reading will begin to change. It is possible to detect each millimeter of liquid drop. When the liquid surface 213 reaches notch C, the capacitance reading will not change while the liquid surface 213 is in the notch C. This will associate the analog reading of level probe 301 with the physical level at 75% full. With these two capacitance readings, capacitance level probe 301 can be calibrated and each analog reading that is made can be associated with a physical level except when the liquid is over the level probe or in the notch.

The benefits of such an auto-calibration are that the need to calibrate each level probe before the installation has been eliminated. The calibration can also be adjusted when external factors affecting the measurement occur (mechanical deformation, liquid properties, etc.).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of providing electrical energy to a dewar containing a cryogenic liquid, comprising:
   introducing an insulated conductive heat-transfer device, with a distal end and a proximal end, into the cryogenic dewar comprising an exterior surface, and
   providing a Seebeck module, with a cold junction and a hot junction, wherein the distal end is in thermodynamic contact with a cryogenic fluid/gas and the proximal end is thermodynamically connected to the cold junction,
   wherein the hot junction is thermodynamically connected to a heat source, thereby producing an electrical energy in the Seebeck module,
   wherein at least a portion of the electrical energy is collected by an energy harvester and stored in an energy storage unit,
   wherein at least a portion of the electrical energy produced and stored is used to power a central processing unit.

2. The method of claim 1, wherein the heat source thermodynamically connected to the hot junction is the exterior surface of the dewar.

3. The method of claim 1, wherein the conductive heat-transfer device is selected from the group consisting of a metallic strip or a bar.

4. The method of claim 1, wherein at least a portion of the energy produced and stored is used to power one or more sensors or devices attached to the dewar.

5. The method of claim 4, wherein the one or more sensors or devices are selected from the group consisting of: an internal temperature sensor and/or an external temperature sensor; data storage memory or data logger; a container opening sensor, and an accelerometer, wherein the accelerometer measures orientation of the dewar, or any shock to the dewar.

6. The method of claim 4, wherein the one or more devices is connected to the central processing unit.

7. The method of claim 6, wherein the central processing unit is connected to the internet of things network.

8. The method of claim 1, wherein the dewar contains the cryogenic liquid, and at least a portion of the energy produced and stored is used to power an embedded level measurement device, wherein the embedded level measurement device measures the level of the cryogenic liquid.

9. The method of claim 8, wherein the embedded level measurement device is connected to the central processing unit.

10. The method of claim 9, wherein the central processing unit is connected to the Internet of Things network.

11. A method of calibrating the embedded level measurement device as claimed in claim 8, wherein:
    the embedded level measurement device comprises a capacitive level probe comprising at least two separated segments, a first segment having a proximal end and a distal end at a first predetermined location, and a second segment having a proximal end at a second predetermined location,
    wherein the first location and the second location are separated by a calibration gap (C),
    wherein the capacitive level probe provides a discontinuous reading when the liquid level is within the calibration gap (C),
    the method comprising:
    taking a first capacitance reading the capacitive level probe when the dewar is full and the cryogenic liquid is at a level at or above the proximal end of the first segment, taking a second capacitance reading when the cryogenic liquid is first at a level corresponding to a location within the calibration gap, and calibrating the level probe by utilizing the first capacitance reading and the second capacitance reading.

12. The method of claim 11, wherein the first segment and the second segment have a total length A, and wherein the first predetermined location is 25% of A.

* * * * *